(12) United States Patent
Hwang et al.

(10) Patent No.: US 12,183,481 B2
(45) Date of Patent: Dec. 31, 2024

(54) BUS BAR WITH SAFETY AGAINST FIRE

(71) Applicant: LG Energy Solution, Ltd., Seoul (KR)

(72) Inventors: Sung-Tack Hwang, Daejeon (KR); Won-Tae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 259 days.

(21) Appl. No.: 17/762,938

(22) PCT Filed: Mar. 24, 2021

(86) PCT No.: PCT/KR2021/003674
§ 371 (c)(1),
(2) Date: Mar. 23, 2022

(87) PCT Pub. No.: WO2021/230489
PCT Pub. Date: Nov. 18, 2021

(65) Prior Publication Data
US 2022/0415537 A1    Dec. 29, 2022

(30) Foreign Application Priority Data

May 15, 2020    (KR) .................... 10-2020-0058253

(51) Int. Cl.
*H01B 7/08* (2006.01)
*A62C 3/16* (2006.01)
(Continued)

(52) U.S. Cl.
CPC .................. *H01B 7/02* (2013.01); *A62C 3/16* (2013.01); *C09J 1/00* (2013.01); *C09J 7/30* (2018.01);
(Continued)

(58) Field of Classification Search
CPC . H01B 7/295; H01B 7/02; H01B 7/04; H01B 7/06; H01B 7/08; H01B 7/009;
(Continued)

(56) References Cited

U.S. PATENT DOCUMENTS 1,946,190 A * 2/1934 Brodhun ................ H01B 7/226
174/105 R
3,649,744 A * 3/1972 Coleman ................ H01B 7/182
174/124 GC
(Continued)

FOREIGN PATENT DOCUMENTS

CN    206421843 U    8/2017
CN    107507935 A    12/2017
(Continued)

OTHER PUBLICATIONS

International Search Report for PCTKR2021003674 dated Jul. 16, 2021, 2 pgs.
(Continued)

*Primary Examiner* — William H. Mayo, III
(74) *Attorney, Agent, or Firm* — Lerner David LLP

(57) ABSTRACT

A bus bar, which includes a metal bar made of an electrically conductive metal material; a bandage member configured to surround the metal bar except for both ends of the metal bar; and an insulating tube configured to surround the metal bar and the bandage member together, wherein the bandage member is made of a metal wire having a surface coated with a coating material having insulation and fire resistance.

10 Claims, 6 Drawing Sheets

(51) Int. Cl.
*C09J 1/00* (2006.01)
*C09J 7/30* (2018.01)
*H01B 7/00* (2006.01)
*H01B 7/02* (2006.01)
*H01B 7/295* (2006.01)
*H01M 50/383* (2021.01)
*H01M 50/503* (2021.01)
*H01M 50/522* (2021.01)
*H01M 50/526* (2021.01)
*H01M 50/588* (2021.01)
*H01M 50/59* (2021.01)

(52) U.S. Cl.
CPC .......... *H01B 7/0009* (2013.01); *H01B 7/295* (2013.01); *H01M 50/383* (2021.01); *H01M 50/503* (2021.01); *H01M 50/522* (2021.01); *H01M 50/526* (2021.01); *H01M 50/588* (2021.01); *H01M 50/59* (2021.01); *C09J 2203/33* (2013.01); *C09J 2301/312* (2020.08); *C09J 2400/10* (2013.01); *H01M 2200/00* (2013.01)

(58) Field of Classification Search
CPC .. H01M 50/59; H01M 50/522; H01M 50/503; H01M 50/588; H01M 5/526; H01M 50/383; C09J 7/30; H01R 24/14; H01R 35/02
USPC .... 174/102 R, 110 R–110 PM, 120 R–124 R
See application file for complete search history.

(56) References Cited

U.S. PATENT DOCUMENTS

| | | | | |
|---|---|---|---|---|
| 3,842,193 A | * | 10/1974 | Johnson | H01F 41/122 174/120 SR |
| 3,867,758 A | * | 2/1975 | Johnson | H01B 13/0883 174/122 G |
| 2005/0282438 A1 | | 12/2005 | Wada | |
| 2012/0009461 A1 | | 1/2012 | Kim et al. | |
| 2013/0149880 A1 | | 6/2013 | Nohira et al. | |
| 2014/0000927 A1 | * | 1/2014 | Hashimoto | H01B 13/06 174/68.2 |
| 2017/0357214 A1 | | 12/2017 | Choi et al. | |
| 2018/0309281 A1 | | 10/2018 | Ichikawa et al. | |
| 2018/0316104 A1 | | 11/2018 | Murakami | |

FOREIGN PATENT DOCUMENTS

| | | | |
|---|---|---|---|
| CN | 109285633 A | 1/2019 | |
| CN | 208938704 U | 6/2019 | |
| JP | S52064397 U | 5/1977 | |
| JP | H06140020 A | 5/1994 | |
| JP | 2006187122 A | 7/2006 | |
| JP | 2012018904 A | 1/2012 | |
| JP | 2012182043 A | 9/2012 | |
| JP | 6056238 B2 | 1/2017 | |
| JP | 2018181780 A | 11/2018 | |
| JP | 2019050109 A | 3/2019 | |
| JP | 6618504 B2 | 12/2019 | |
| KR | 100715963 B1 | 5/2007 | |
| KR | 20070054403 A | 5/2007 | |
| KR | 100981924 B1 | 9/2010 | |
| KR | 20150101154 A | 9/2015 | |
| KR | 101579124 B1 | 12/2015 | |
| KR | 20160049260 A * | 5/2016 | ............ H01R 25/14 |
| KR | 101684904 B1 | 12/2016 | |
| KR | 20170021697 A | 2/2017 | |
| KR | 20190009120 A | 1/2019 | |
| WO | 2017-156529 A1 | 9/2017 | |

OTHER PUBLICATIONS

Extended European Search Report for Application No. 21804617.5 dated Dec. 22, 2022. 8 pgs.

Search Report dated Jun. 26, 2024 from Office Action for Chinese Application No. 202180005433.4. 3 pgs.

* cited by examiner (a)          (b)

(a)          (b)

(a)    (b)

BUS BAR WITH SAFETY AGAINST FIRE

CROSS-REFERENCE TO RELATED APPLICATIONS

The present application is a national phase entry under 35 U.S.C. § 371 of International Application No. PCT/KR2021/003674 filed Mar. 24, 2021, published in Korean, which claims priority from 10-2020-0058253 filed May 15, 2020, all of which are incorporated herein by reference.

TECHNICAL FIELD

The present disclosure relates to a bus bar, and more particularly, to a bus bar used for conducting a high current to a battery module/pack and having a coating structure with excellent safety against fire.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

Recently, secondary batteries are widely used not only in small devices such as portable electronic devices but also in middle-sized or large-sized devices such as electric vehicles and energy storage systems (ESS). For example, when used in electric vehicles, in order to increase energy capacity and output, a large number of secondary batteries are electrically connected to form a battery module, and a plurality of battery modules are connected to form a battery pack.

Meanwhile, a bus bar is widely used as an electrical connection means for the battery modules, and the bus bar is useful as a means of conducting a high current because the bus bar may stably flow a high current even with a relatively small thickness compared to a cable.

The bus bar may be provided in the form of a metal bar such as copper or aluminum with good electrical conductivity, and for safety, the metal bar is covered with a tube or an extruded material, except for both ends of the metal bar connected to terminals.

The bus bar may be classified into a rigid bus bar and a flexible bus bar. In particular, the flexible bus bar 1 may be made into a desired shape by bending or twisting a necessary part, as shown in FIG. 1, so the flexible bus bar 1 may be usefully used when connecting battery modules having different vibration axes or placed on complicated paths.

Meanwhile, the flexible bus bar 1 is easy to deform due to flexibility, but when fire occurs inside the battery pack, for example, the insulating tube 2 may be destroyed and sag by fire as shown in FIG. 2 so that a central portion of the metal bar 3 may contact a surrounding metal object 4 to cause a short circuit.

Therefore, even if the insulating tube is destroyed by fire from the bus bar, a method to prevent the metal bar from directly contacting the surrounding metal object is demanded.

SUMMARY

Technical Problem

The present disclosure is designed to solve the problems of the related art, and therefore the present disclosure is directed to providing a bus bar configured not to cause a short circuit since a metal bar does not directly contact a surrounding metal object even if an exterior sheath of the bus bar is destroyed by fire.

Other objects and advantages of the present disclosure will be described below, and will be appreciated by embodiments of the present disclosure. In addition, the objects and advantages of the present disclosure can be realized by components defined in the claims and a combination thereof.

Technical Solution

In one aspect of the present disclosure, there is provided a bus bar, comprising: a metal bar made of an electrically conductive metal material; a bandage member surrounding the metal bar except for both ends of the metal bar; and an insulating tube surrounding both the metal bar and the bandage member.

The bandage member may be made of one or more metal wires and a surface of the one or more metal wires may be coated with an insulative and fire resistant coating material.

The coating material may be any one material selected from mica, silica and ceramic.

The one or more metal wires may be annular metal bands.

The plurality of annular metal bands may be arranged at regular intervals along a longitudinal direction of the metal bar.

The plurality of annular metal bands may be compressively fixed to the metal bar around a perimeter of the metal bar.

The bus bar may further comprise a attached to a surface of the metal bar, and the bandage member may surround the fire-resistive tape.

The one or more metal wires may include a metal wire wound around a perimeter of the metal bar in a helical structure extending along a longitudinal direction of the metal bar.

The insulating tube may be a transparent silicon material.

The metal bar may comprise a plurality of stacked metal plates, each metal plate having a thickness of 0.1 to 0.3 mm.

In another aspect of the present disclosure, there is also provided a battery pack, comprising the bus bar of any of the embodiments described herein.

Advantageous Effects

The bus bar according to the present disclosure may prevent a short circuit from occurring since the metal bar is configured not to directly contact a surrounding metal object even if an exterior sheath of the bus bar is destroyed by fire.

In other words, in the bus bar according to the present disclosure, since the metal bar inside the exterior sheath is surrounded by a metal wire coated with a fire-resistant material, even if the exterior sheath is destroyed by fire when a fire occurs inside the battery pack, the metal wire remains. Thus, even if the metal bar sags, the surface of the metal bar does not directly contact a surrounding metal object, thereby preventing a short circuit.

The effects of the present disclosure are not limited to the above, and effects not mentioned herein may be clearly understood from the present specification and the accompanying drawings by those skilled in the art.

DETAILED DESCRIPTION

Figure 1:
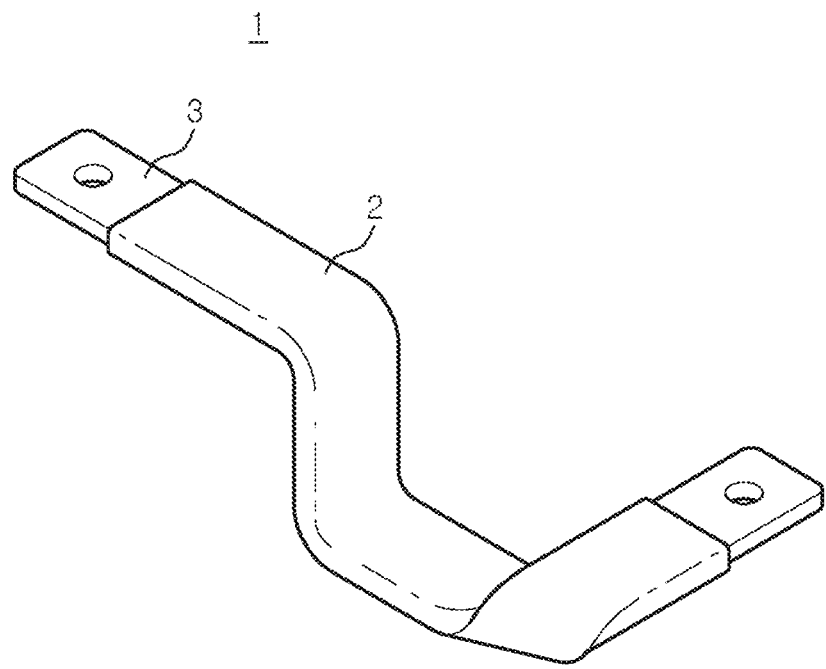
FIG. 1 is a schematic perspective view showing a conventional flexible bus bar.
Figure 2:
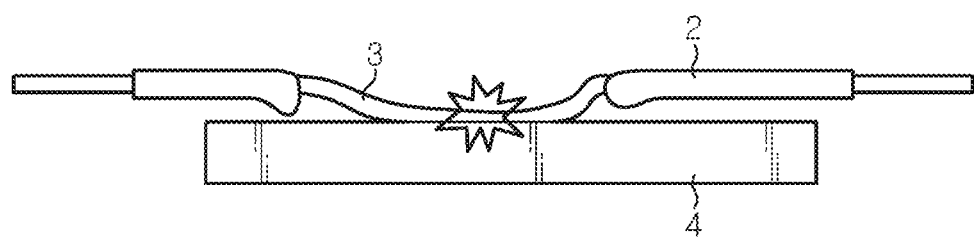
FIG. 2 is a reference view showing an example where an insulating tube of the flexible bus bar of FIG. 1 is destroyed by fire so that the bus bar directly contacts a surrounding metal object to cause a short circuit.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 3:
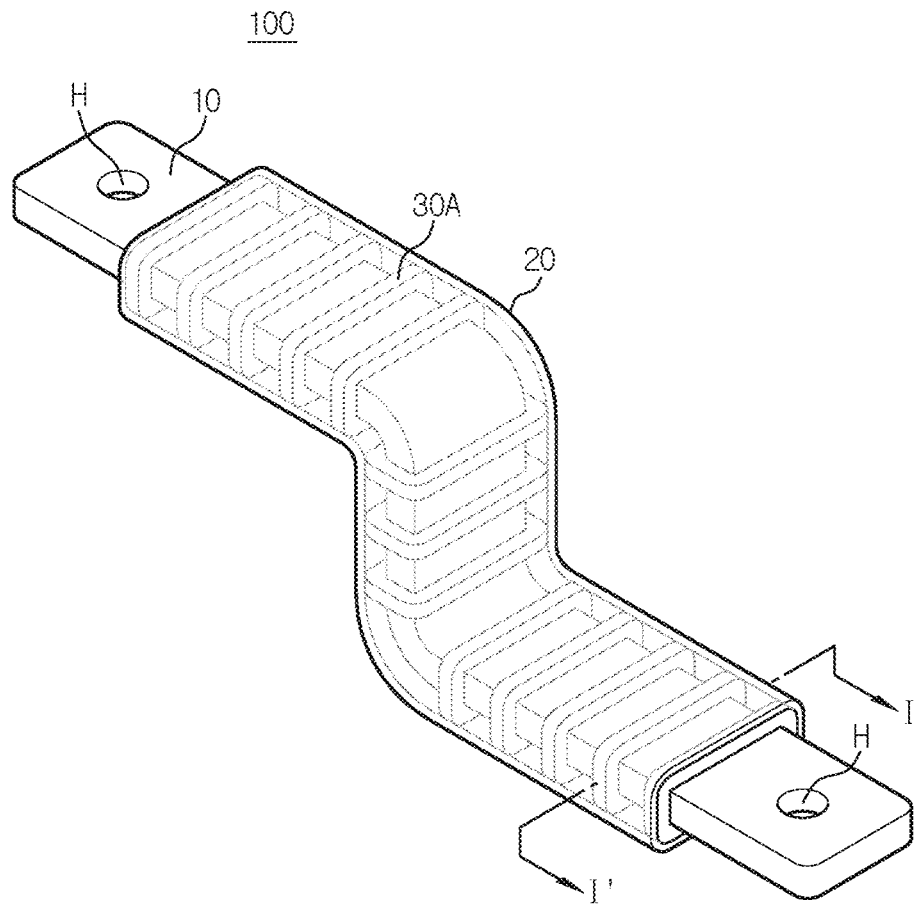
FIG. 3 is a perspective view showing a bus bar according to the first embodiment of the present disclosure.
Figure 4:
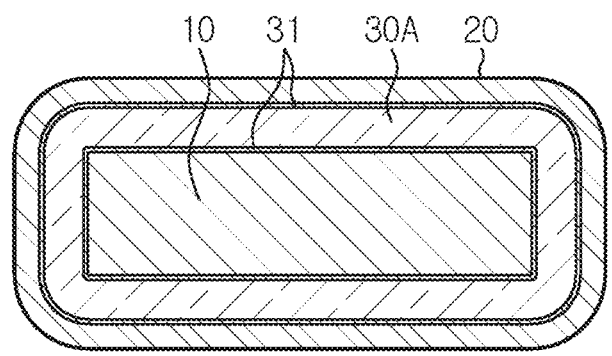
FIG. 4 is a sectional view showing the bus bar, taken along the line I-I' of FIG. 3.

FIG. 3 is a perspective view showing a bus bar 100 according to the first embodiment of the present disclosure, and FIG. 4 is a sectional view showing the bus bar 100, taken along the line I-I' of FIG. 3.

Referring to FIGS. 3 and 4, the bus bar 100 according to an embodiment of the present disclosure includes a metal bar 10 made of an electrically conductive metal material, an insulating tube 20 configured to cover the metal bar 10 not to be exposed to the outside except for both ends of the metal bar 10, and a bandage member 30A configured to surround the perimeter of the metal bar 10 inside the insulating tube 20.

The thickness and width of the metal bar 10 may be determined according to the magnitude of conducted current, and its length may also be selected variously according to the installation location or installation conditions. The metal bar 10 may be formed by stacking several thin metal plates. For example, the metal bar 10 may be prepared in a flexible structure that may be twisted or bent by stacking copper plates of approximately 0.1 to 0.3 mm and welding both ends thereof integrally.

One end of both ends of the metal bar 10 may be connected to a (+) terminal of any one battery module, and the other end may be connected to a (−) terminal of another battery module. For example, the terminals of the battery module may be configured in a bolt form that is inserted into a hole H formed at both ends of the metal bar 10 and then fastened with a nut to firmly fix the connection part.

The insulating tube 20 is an exterior sheath of the metal bar 10, and may be made of silicone, rubber or a polymer material with elasticity, and may be provided on the metal bar 10 to cover the metal bar 10 and the bandage member 30A together.

The insulating tube 20 of this embodiment may be made of transparent silicone. The insulating tube 20 made of transparent silicone has an advantage in that a binding state of the metal bar 10 and the bandage member 30A therein can be checked at any time.

Referring to FIG. 4, the bandage member 30A is a component that surrounds the perimeter of the metal bar 10 inside the insulating tube 20, and may be made of a metal wire whose surface is coated with a coating material 31 having electrical insulation and fire resistance.

Even if the insulating tube 20 melts down and disappears completely due to fire, since the bandage member 30A is made of a metal wire, the bandage member 30A is kept in the form of surrounding the metal bar 10. Therefore, even if the insulating tube 20 is destroyed by fire so that a middle portion of the metal bar 10 is exposed, the structure that the bandage member 30A still surrounds and supports the metal bar 10 is maintained as it is. Thus, even if the metal bar 10 sags toward a surrounding metal structure 4, it is possible to prevent the surface of the metal bar 10 from directly contacting the surrounding metal structure 4. At this time, even though the bandage member 30A comes into contact with the surrounding metal structure 4, since the bandage member 30A is coated with a material having electrical insulation and fire resistance, a current does not pass therethrough, so a short circuit does not occur.

As the coating material 31 having insulation and fire resistance, at least one selected from mica, silica and ceramic may be employed. Here, it is not necessary to use any one material among mica, silica and ceramic as the coating material 31 of the metal wire. That is, in addition to the coating materials 31 exemplified in this specification, any material excellent in electrical insulation, fire resistance and heat resistance may be used to coat the metal wire.

Specifically, seeing the bandage member 30A according to this embodiment, the metal wire included in the bandage member 30A may be provided in plural in the form of an annular metal band.

As shown in of FIG. 5(a), the annular metal band is provided in plural, and the plurality of annular metal bands may be arranged at regular intervals along the longitudinal direction of the metal bar 10. If the annular metal bands are arranged at regular intervals along the longitudinal direction of the metal bar 10 as above, it may be easy to deform the shape of the metal bar 10 by bending the metal bar 10. For example, in the flexible bus bar 100, if the bandage member 30A is configured in the form of a long tube like the insulating tube 20, a most region of the metal bar 10 is held by the bandage member 30A, and thus it may be very difficult to bend or twist the metal bar 10.

However, according to the configuration of this embodiment in which the bandage member 30A is manufactured using a plurality of metal bands that are arranged at regular intervals along the longitudinal direction of the metal bar 10, the region of the metal bar 10 not surrounded by the metal bands may be bent or twisted as desired.

Figure 5:
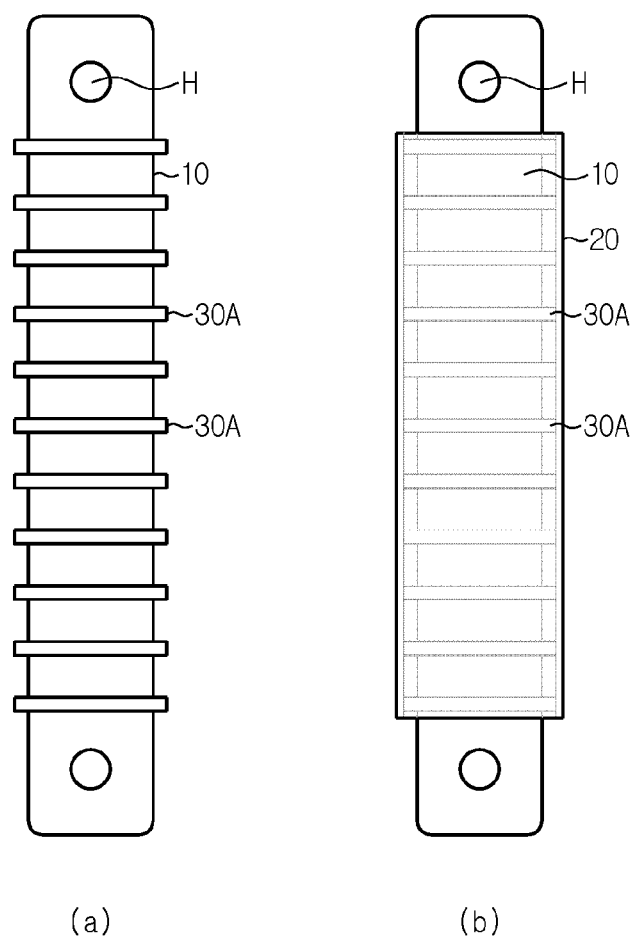
FIG. 5 is a diagram for illustrating a process of manufacturing the bus bar according to the first embodiment of the present disclosure.

The process of manufacturing the bus bar 100 of this embodiment will be described briefly. As shown in FIG. 5(*a*), the annular metal bands are mounted to the metal bar 10 one by one in a fitting manner. As an alternative, it is possible to use a method of winding a straight metal band around the perimeter of the metal bar 10 and welding both ends of the metal band to form an annular shape, thereby fixing the metal band to the metal bar 10.

If the annular metal bands are mounted to the metal bar 10 in this way so that the annular metal bands surrounds the perimeter of the metal bar 10, the annular metal bands are compressively fixed to the metal bar 10 using a clinching tool, thereby strengthening the bonding force between the metal bands and the metal bar 10.

Next, as shown in FIG. 5(*b*), the insulating tube 20 is covered on the outer side of the metal bar 10 and the bandage member 30A to shield the metal bar 10 and the bandage member 30A except for both ends of the metal bar 10, thereby securing the electrical safety of the bus bar 100.

Figure 6:
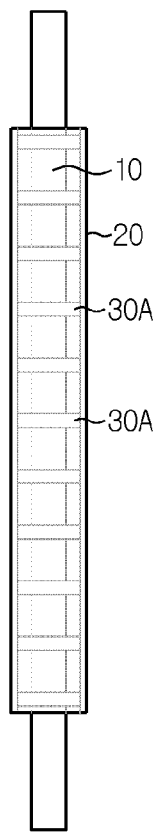
FIG. 6 is a side view showing the bus bar of FIG. 5(b).

In the bus bar 100 according to the embodiment of the present disclosure, as shown in FIG. 6, the metal wire is interposed inside the insulating tube 20, so the thickness of the coating portion may be greater than that of the conventional bus bar 100.

The bus bar 100 according to this embodiment as described above may be used to connect a plurality of battery modules in series, for example, in a pattern where one end of the bus bar 100 is fixedly connected to the (+) terminal of any one battery module and the other end of the bus bar 100 is fixedly connected to the (−) terminal of another battery module.

In particular, if the bus bar 100 is used, when a fire occurs inside the battery pack containing a plurality of battery modules, even though the insulating tube 20 is completely melted down and destroyed by fire and the bus bar 100 sags, the metal bar 10 does not come into direct contact with the surrounding metal object.

Figure 7:
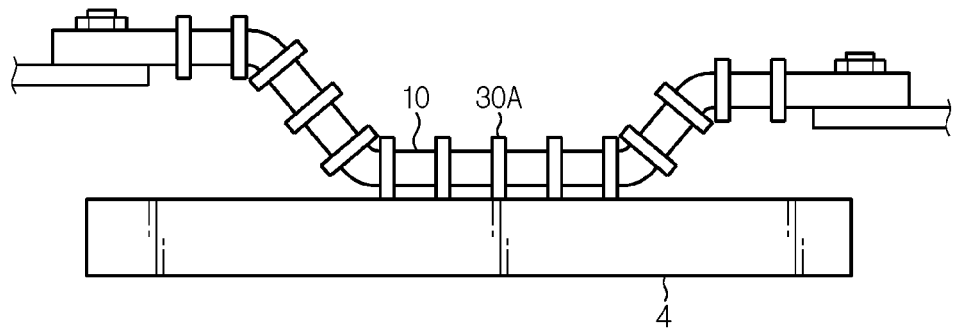
FIG. 7 is a diagram compared with FIG. 1 and exemplarily shows a contact state between the bus bar and the surrounding metal object after an insulating tube of the bus bar according to the first embodiment of the present disclosure is entirely destroyed by fire.

For example, as shown in FIG. 7, even if the insulating tube 20 of the bus bar 100 is destroyed by fire, the bandage member 30A is not destroyed but remains bound to the metal bar 10. At this time, since the bandage member 30A supports the metal bar 10 so that the metal bar 10 does not contact the surrounding metal structure 4, it is possible to prevent a short circuit.

Figure 8:
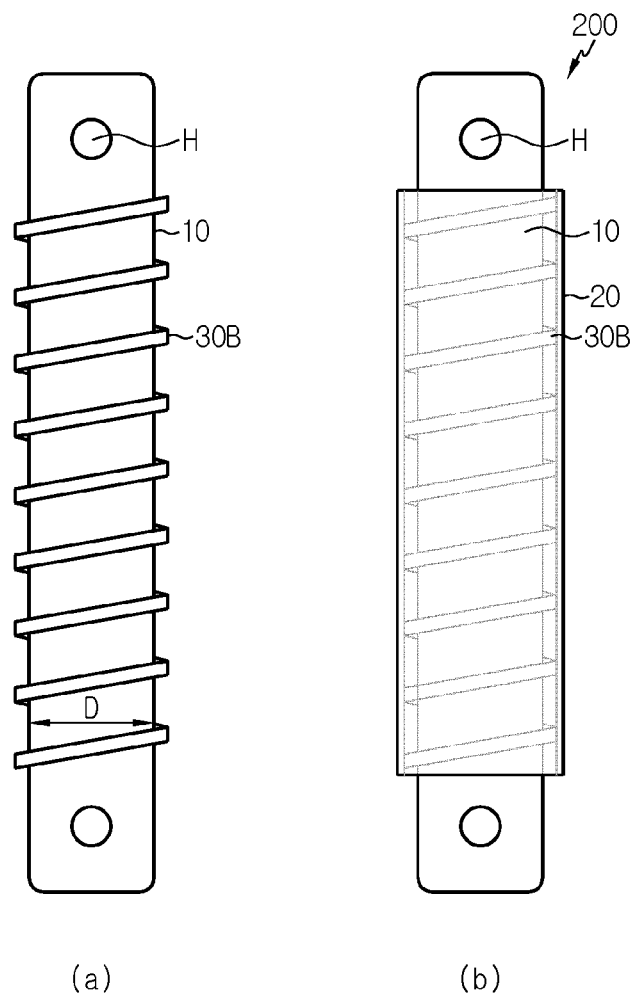
FIG. 8 is a diagram showing a bus bar according to the second embodiment of the present disclosure.
Figure 9:
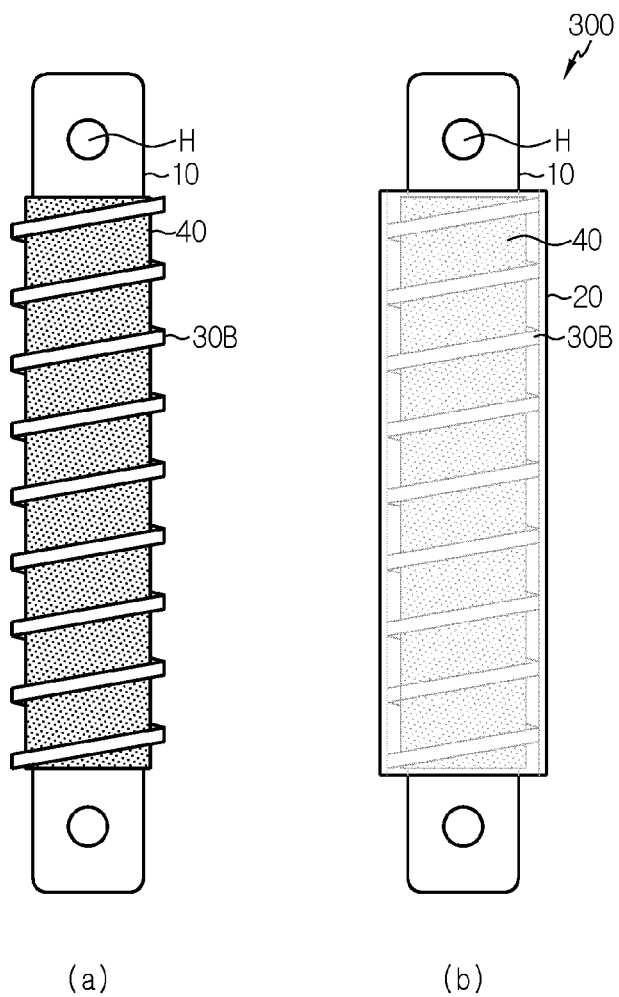
FIG. 9 is a diagram showing a bus bar according to the third embodiment of the present disclosure.

FIG. 8 is a diagram showing a bus bar 200 according to the second embodiment of the present disclosure, and FIG. 9 is a diagram showing a bus bar 300 according to the third embodiment of the present disclosure.

Next, other embodiments of the present disclosure will be described with reference to FIGS. 8 and 9.

The same reference numerals as in the previous drawings denote the same members, and will not be described in detail again, and features different from the former embodiment will be mainly described.

The bus bar 200 according to the second embodiment of the present disclosure is different from the first embodiment in that the metal wire of the bandage member 30B has a helical structure or a coil spring structure, and the other features are the same.

Specifically, as shown in of FIG. 8(*a*), in the bus bar 200 of the second embodiment, the metal wire of the helical structure forming the bandage member 30B may be provided to surround the perimeter of the metal bar 10 along the longitudinal direction of the metal bar 10. In addition, as shown in FIG. 8(*b*), the electrical safety of the bus bar 200 may be secured by covering the insulating tube 20 on the outer side of the metal bar 10 and the bandage member 30B to shield the metal bar 10 except for both ends of the metal bar 10.

In particular, before being inserted into the metal bar 10, the metal wire of the helical structure may have a diameter smaller than the width (D) of the metal bar 10. By inserting the metal bar 10 into the metal wire of the helical structure having an initial diameter smaller than the width of the metal bar 10, the metal bar 10 may be compressed by the bandage member 30B. In this case, it is possible to sufficiently secure the binding force between the metal bar 10 and the bandage member 30B without an additional process. That is, the bandage member 30B may be firmly bound to the metal bar 10 without performing an additional process such as bonding, welding and compressing.

The process of manufacturing the bandage member 30B made of a metal wire having a ceramic-coated helical structure will be described briefly.

First, a metal wire of a helical structure (or, a spring structure) made of pure metal is prepared. Then, the metal wire of a helical structure (or, a spring structure) is deformed into a straight line through a leveling operation. After that, ceramic is melted and injected to coat the surface of the metal wire. As an alternative coating method, heat treatment may be used after glazing, or chemical vapor deposition (CVD), physical vapor deposition (PVD), or the like may also be used. Then, heat is applied to the ceramic-coated metal wire to transform into a metal wire type of a helical structure (or, a spring structure), thereby providing the bandage member 30B according to the second embodiment.

The bus bar 300 according to the third embodiment of the present disclosure may be regarded as further including a fire-resistive tape 40, when compared with the former embodiments.

Specifically, referring to FIG. 9, in the bus bar 300 according to the third embodiment, the fire-resistive tape 40 is attached to the surface of the metal bar 10, and the metal bar 10 and the fire-resistive tape 40 are integrally wrapped with the bandage member 30A. Also, the insulating tube 20 is covered on the outer side of the bandage member 30A.

The fire-resistive tape 40 is a tape with fire resistance for at least 600° C. or higher and electrical insulation so as not to be destroyed by fire, and the fire-resistive tape 40 is a component responsible for protecting the metal bar 10 so that the metal bar 10 is not exposed even if the insulating tube 20 is destroyed by fire.

For example, as the fire-resistive tape 40, a mica tape having excellent fire resistance and heat resistance may be used. Here, in addition to the mica tape, any tape excellent in electrical insulation, fire resistance and heat resistance may also be used.

The fire-resistive tape 40 is attached to the metal bar 10 before the metal bar 10 is covered by the insulating tube 20. At this time, the fire-resistive tape 40 having an adhesive substance on one surface is more preferred for easy attachment. However, since the fire-resistive tape 40 may be fixed to the metal bar 10 by using the bandage member 30A of the first embodiment or the bandage member 30B of the second embodiment, the fire-resistive tape 40 may also not have an adhesive substance on one surface thereof.

The bus bar 300 of the third embodiment may be regarded as a safer bus bar 300 in terms of electrical insulation, compared to the former embodiments. That is, the ceramic coating is not easily peeled off due to its strong coating power, but the ceramic coating may be broken when subjected to a strong impact. In this case, in the case of the bus bar 100 of the first embodiment or the bus bar 200 of the second embodiment, since the metal wire surrounds the metal bar 10, when a fire occurs, even if the metal bar 10 does not directly contact the surrounding metal structure 4, a current may flow in the metal wire, which may cause a short circuit. However, in the bus bar 300 of the third embodiment, even if the ceramic coating is broken, electrical insulation may still be secured by the fire-resistive tape 40, and accordingly, a short circuit does not occur in the above situation.

According to the bus bar according to the present disclosure, which has the configuration and operation as described above, even if the exterior sheath is destroyed by fire, it is possible to prevent the metal bar 10 from directly contacting the surrounding metal structure 4, and accordingly, a short circuit may not be caused. Therefore, it is possible to prevent a fire accident from spreading to a secondary fire.

Meanwhile, a battery pack according to the present disclosure may be configured to include at least one bus bar 100 described above. In addition to the bus bar 100, the battery pack may further include battery modules electrically connected by the bus bar 100, as well as various devices for controlling charging and discharging of the battery modules, such as a BMS, a current sensor, a fuse, and the like.

The battery pack may be applied to vehicles such as an electric vehicle or a hybrid electric vehicle. Also, the battery pack may be applied to energy storage systems or other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A bus bar, comprising:
    a metal bar made of an electrically conductive metal material;
    a bandage member comprising one or more metal wires wrapped around the metal bar except for both ends of the metal bar, wherein a surface of the one or more metal wires is coated with an insulative and fire resistant coating material, and wherein the one or more metal wires are arranged such that the metal bar remains partially exposed along a plurality of longitudinal gaps between portions of the one or more metal wires; and
    an insulating tube fully surrounding the metal bar and the bandage member together.

2. The bus bar according to claim 1,
    wherein the coating material is any one material selected from mica, silica and ceramic.

3. The bus bar according to claim 1,
    wherein the one or more metal wires is a plurality of annular metal bands.

4. The bus bar according to claim 3,
    wherein the plurality of annular metal bands are arranged at regular intervals along a longitudinal direction of the metal bar, and wherein a distance of each of the plurality of longitudinal gaps is defined by the regular intervals.

5. The bus bar according to claim 3,
    wherein the plurality of annular metal bands are compressively fixed to the metal bar around a perimeter of the metal bar.

6. The bus bar according to claim 1, further comprising a fire-resistive tape attached to a surface of the metal bar, wherein the bandage member surrounds the fire-resistive tape.

7. The bus bar according to claim 1,
    wherein the one or more metal wires includes a metal wire wound around a perimeter of the metal bar in a helical structure extending along a longitudinal direction of the metal bar, wherein each of the plurality of longitudinal gaps is a space between windings of the metal wire.

8. The bus bar according to claim 1,
    wherein the insulating tube is a transparent silicon material.

9. The bus bar according to claim 1,
    wherein the metal bar comprises a plurality of stacked metal plates, each metal plate having a thickness of 0.1 to 0.3 mm.

10. A battery pack, comprising the bus bar according to claim 1.

* * * * *